United States Patent
Lee et al.

(10) Patent No.: US 9,221,961 B2
(45) Date of Patent: Dec. 29, 2015

(54) FLAME-RETARDANT POLYOLEFIN RESIN CONTAINING PIPERAZINE-BASED METAL SALT BLEND

(75) Inventors: Dae Hee Lee, Cheongju-si (KR); Seong Wook Lee, Daejun-Si (KR); Sang-Bum Kim, Cheongju-si (KR); Chang-Gyou Kim, Seoul (KR); Seung-Dae Ahn, Daejeon (KR); Jong-In Ahn, Daejeon (KR)

(73) Assignees: DOOBON INC., Choong-Buk (KR); LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 13/978,575

(22) PCT Filed: Dec. 14, 2011

(86) PCT No.: PCT/KR2011/009637
§ 371 (c)(1),
(2), (4) Date: Jul. 8, 2013

(87) PCT Pub. No.: WO2012/093781
PCT Pub. Date: Jul. 12, 2012

(65) Prior Publication Data
US 2013/0296467 A1 Nov. 7, 2013

(30) Foreign Application Priority Data
Jan. 6, 2011 (KR) .......... 10-2011-0001406

(51) Int. Cl.
*C08K 5/529* (2006.01)
*C08K 5/521* (2006.01)
*C09K 21/12* (2006.01)
*C08K 3/26* (2006.01)
*C08K 5/3492* (2006.01)
*C08K 5/52* (2006.01)
*C08L 23/10* (2006.01)

(52) U.S. Cl.
CPC . *C08K 5/529* (2013.01); *C08K 3/26* (2013.01); *C08K 5/34928* (2013.01); *C08K 5/521* (2013.01); *C08K 5/5205* (2013.01); *C09K 21/12* (2013.01); *C08L 23/10* (2013.01); *C08L 2201/02* (2013.01)

(58) Field of Classification Search
CPC ......... C08L 23/10; C08L 23/04; C08L 23/16; C08K 21/12; C08K 5/34928; C08K 5/5205; C08K 3/26; C08K 5/521; C08K 5/529
USPC .................................................. 524/100, 127
See application file for complete search history.

(56) References Cited

U.S. PATENT DOCUMENTS

| 7,465,761 B2 * | 12/2008 | Murase et al. ................ 524/100 |
| 2008/0241529 A1 | 10/2008 | Bauer et al. |
| 2010/0249286 A1 | 9/2010 | Yamaki et al. |

FOREIGN PATENT DOCUMENTS

| EP | 1164160 A1 | 12/2001 |
| EP | 1277794 A1 | 1/2003 |
| JP | 2001011462 A * | 1/2001 |
| JP | 2001348490 | 12/2001 |
| JP | 2005120021 A * | 5/2005 |
| KR | 1020100072054 | 6/2010 |
| KR | 1020100078823 | 7/2010 |
| WO | WO 2009063732 A1 * | 5/2009 |

OTHER PUBLICATIONS

JP 2005-120021 A (2005), machine translation, JPO Advanced Industrial Property Network (AIPN).*
JP 2001-011462 A (2001), machine translation, JPO Advanced Industrial Property Network (AIPN).*
International Search Report mailed Sep. 24, 2012 for PCT/KR2011/009637.
Tosoh Corp, Database WPI, Week 200132, Jan. 16, 2001, Thomson Scientific, London, GB; AN 2001-303629 XP002736084 & JP 2001-011462A.
Extended European Search Report dated Mar. 9, 2015.

* cited by examiner

*Primary Examiner* — Susannah Chung
*Assistant Examiner* — Josephine Chang
(74) *Attorney, Agent, or Firm* — Hauptman Ham, LLP

(57) ABSTRACT

Provided herein is a flame-retardant polyolefin resin containing a blend which comprises 1-80 wt % of piperazine metal salts or polymers thereof, 10-80.0 wt % of nitrogen-containing synergists or phosphorus/nitrogen retardants, and 1-50 wt % of inorganic compounds, wherein the sum of the components of the blend is 100 wt %.

6 Claims, 1 Drawing Sheet

FLAME-RETARDANT POLYOLEFIN RESIN CONTAINING PIPERAZINE-BASED METAL SALT BLEND

TECHNICAL FIELD

The present invention relates to a flame-retardant blend and a method preparing the same, and more particularly, to a polyolefin resin having an excellent flame-retardancy and containing a piperazine-based metal salt blend.

BACKGROUND ART

A thermoplastic resin has excellent chemical resistance, mechanical strength, and electrical insulation, to be widely used in a housing, a connector, and the like, of electrical, electronic, and automobile components. In the case in which the thermoplastic resin is used for electrical and electronic device fields, it is necessary to impart flame-retardancy in order to secure safety against a fire.

A flame-retardant has an influence on the safety of the thermoplastic plastic during a preparing process in a molten state thereof. A large amount of the flame-retardant should be used in order to satisfy an appropriate flame-retardancy of a plastic according to international standards. In addition, a chemical reaction is required at a high temperature to implement flame-retardancy, such that the flame-retardant may damage a processing stability of the plastic. For example, polymer degradation, a cross linking reaction, gas release or decoloration may be increased. In addition, in the above-described process, a halogen-based gas is generated by pyrolysis, thereby causing deterioration in working environment due to corrosion of devices such as a molding device, a die, and the like, and a toxic gas.

In particular, it is found that the case of using a phosphoric flame-retardant in polyethylene and polypropylene is not sufficient for reducing problems caused by the processes such as the decoloration and the degradation of the resin.

The following patent documents such as PCT/EP97/01664 and Germany Laid-Open Publication Nos. 19734437 and 19737727 disclose that a flame-retardancy may be increased by blending a main flame-retardant with other flame-retardants as a flame-retardant synergistic as compared to the case of using the main flame-retardant alone. In addition, they disclose that an example of the synergistic may include melamine and a melamine compound (melamine cyanurate and melamine phosphate), which may independently impart some degree of flame-retardancy to any kind of thermoplastic plastic, however, significantly improved effects obtained by blending with a phosphinic acid, or the like.

Recently, a piperazine pyrophosphate compound has become interested in that it has remarkable effects as one component of a flame-retardant composition added in a synthetic resin. A method for preparing the piperazine pyrophosphate has been largely reported. For example, Japanese Patent Laid-Open Publication No. Sho 47-88791 discloses a piperazine pyrophosphate as a sparingly water-soluble precipitate, which is obtained by reacting a piperazine hydrochloride salt with sodium pyrophosphate in an aqueous solution. In addition, U.S. Pat. Nos. 3,810,850 and 4,599,375 disclose that a method of preparing a piperazine pyrophosphate as a precipitate obtained by reacting piperazine (anhydride) with sodium pyrophosphate (anhydride) in an aqueous solution, followed by treatment with a hydrochloric acid. However, research into a piperazinic acid metal salt compound has not been found. In particular, it may be appreciated that piperazine diphosphate present as an intermediate is water-soluble and has an excellent flame-retardancy, but has a difficulty in treatment, such that piperazine diphosphate is prepared as a metal salt compound to thereby be utilized as a flame-retardant having a structural safety and excellent quality.

In addition, it is well known that sodium chloride, or the like, is produced as an impurity generated by the above-described preparation, resulting in negative effects at the time of being applied to a semiconductor, an electronic device, or the like. Further, according to the above-described preparation, the thus-prepared product has a low yield, a raw material is expensive, and cost for treating waste is required. In addition, since piperazine diphosphate having good flame-retardancy is water-soluble, which is one of the biggest problems, it has difficulty in being applied to a resin and treatment.

In the case in which piperazine diphosphate or piperazine pyrophosphate is used as one component of the flame-retardant composition, at least about 30 wt % or more as an amount thereof, which is a large amount, should be treated in order to show V—O flame rating retardancy except for the effect of the impurity. Therefore, the large amount of expensive piperazine pyrophosphate is not significantly effective in view of an economical aspect.

DISCLOSURE

Technical Problem

One object of the present invention is to provide a thermoplastic polyolefin resin having significantly excellent flame-retardancy in which a piperazine-based compound and a melamine-based compound are used as a polyolefin-based resin at an appropriate ratio and a filler is selectively added thereto to thereby have excellent flame-retardancy without deterioration in mechanical property, and halogen is not included therein, such that a halogenated toxic gas is not generated, and a method for preparing the same.

Technical Solution

In one general aspect, the present invention is to provide a flame-retardant polyolefin resin containing a piperazine-based metal salt blend capable of having an excellent processing treatment property, an excellent flame-retardant property, and a color property in a polyolefin polymer composition by using a flame-retardant blend containing a condensation product having 1 to 80.0 wt % of a piperazinic acid salt or a polymer thereof and 10 to 80.0 wt % of melamine polyphosphate which is a phosphorus/nitrogen flame-retardant, and 0.1 to 30 wt % of a basic compound or an amphoteric compound or an inorganic compound thereof as a stabilizer, wherein the total amount of each component is 100 wt %.

Advantageous Effects

The polyolefin resin composition having excellent flame-retardancy according to the present invention may contain 10 to 60 wt % of a flame-retardant blend including 1 to 80.0 wt % of the piperazine salt compound, 10 to 80 wt % of the melamine-based compound, and the filler, based on 100 parts by weight of the thermoplastic polyolefin-based resin, wherein the piperazine salt compound is piperazine diphosphate or piperazine pyrophosphate. In particular, in the case of preparing the blend having excellent uniformity and dispersion at the appropriate ratio, the mixer, or the like, capable of providing the appropriate heat may be used, and due to the applied heat and the latent heat itself, the flame-retardant formulated in the pellet, or the like, may be prepared.

BEST MODE

The present inventors studied as to a nonhalogen-based flame-retardant, as a result, was focused on a piperazinic acid salt compound as a salt, having high content of phosphorus, and found that the flame-retardant containing a melamine salt and an inorganic flame-retardant of the compound as an effective component is capable of imparting an excellent flame-retardancy without deterioration in mechanical properties with respect to every kind of resin, thereby completing the present invention. That is, the object of the present invention is to provide a nonhalogen-based flame-retardant composition capable of imparting the excellent flame-retardancy without deterioration in the mechanical properties and generation of smoke and an offensive odor by containing the piperazinic acid salt metal compound represented by the following Chemical Formula 1, with respect to a polyolefin resin, and a resin having an excellent flame-retardancy.

[Chemical Formula 1]

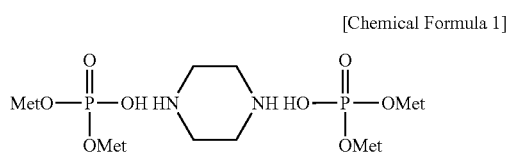

Piperazine Diphosphate Metal Salt

In a process for preparing the blend of the present invention in a molten state, decoloration of a plastic is decreased, degradation of the plastic is suppressed, and a flame-retardancy is completely maintained. In addition, it is surprisingly found that an additive of the present invention completely prevent volatile foreign materials from being generated during processes of extrusion and injection mold. An example of well-known metals included in the piperazinic acid metal salt compound may preferably include aluminum, calcium, magnesium, and zinc.

A phosphoric acid and piperazine are reacted with each other in an aqueous solution, treated with a hydrochloric acid, to recrystallize, thereby obtaining a piperazine diphosphate precipitate as an intermediate of piperazine pyrophosphate. In addition, a dehydration-condensation reaction may be performed to obtain a sparingly water-soluble piperazine pyrophosphate (Chemical Formula 2). Both of piperazine diphosphate and piperazine pyrophosphate have excellent properties as a flame-retardant, but piperazine diphosphate is water-soluble to have a limitation in use thereof. The following Chemical Formula 3 shows a piperazinic acid metal salt obtained by reacting piperazine diphosphate with the metal, as the intermediate.

[Chemical Formula 2]

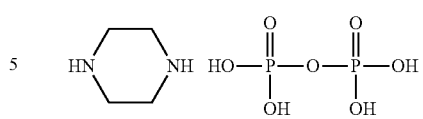

Piperazine Pyrophosphate

[Chemical Formula 3]

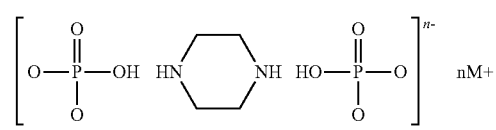

Piperazine Metal Salt

It is preferred that metal (M) in the piperazine diphosphate compound used in the flame-retardant blend of the present invention may be aluminum, calcium, magnesium, zinc, and the like. One molecule of piperazine diphosphate may be bonded up to four (n=4) metals, and even in the case in which piperazine diphosphate is bonded to one metal (n=1), the sparingly water-soluble compound may be prepared and may function as the flame-retardant.

Figure 1:
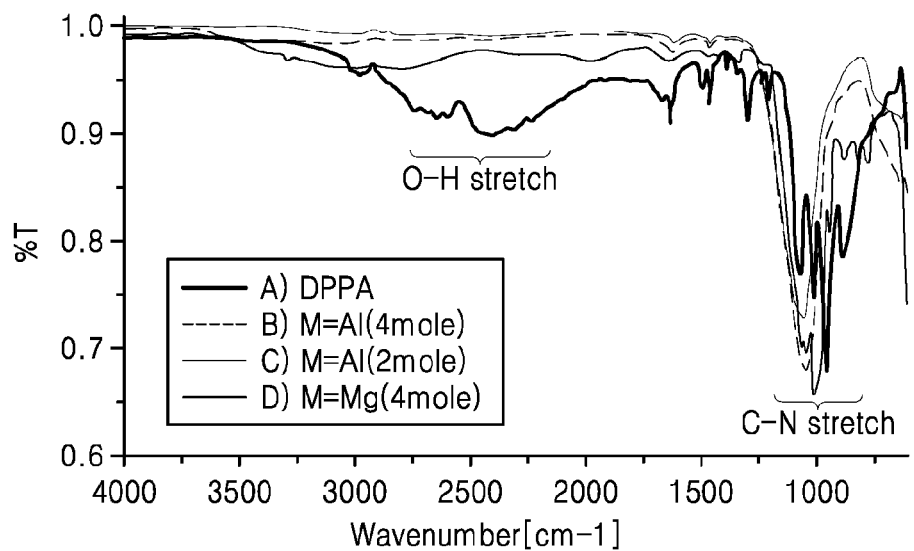
FIG. 1 is a graph showing results obtained by a FT-IR analysis of a piperazinic acid diphosphate compound.

FIG. 1 is a graph showing results obtained by a FT-IR analysis of the piperazinic acid diphosphate compound, which is a spectrum before and after a metal (M=Al and Mg) salt reaction of the synthesized piperazinic acid diphosphate. It may be appreciated from FIG. 1 that before the reaction, a hydroxyl group (OH group) completely disappeared as a salt at about 2400 to 3400 (cm−1). Therefore, it may be determined that the sparingly water-soluble piperazine diphosphate metal salt was well prepared.

In addition, the phosphorus/nitrogen flame-retardant used in the present invention may be dimelamine phosphate, dimelamine pyrophosphate, melamine phosphate, melamine pyrophosphate, melamine polyphosphate, melam polyphosphate, melon polyphosphate and melem polyphosphate, and mixed polysalt. The melamine polyphosphate is more preferred.

It has been well known that various metal oxides are used as a filler and a stabilizer. In particular, it is preferred that the metal oxides may be magnesium oxide, zinc oxide, manganese oxide and/or tin oxide, and hydroxide may be magnesium hydroxide, hydrotalcite, hydrocalumite, calcium hydroxide, zinc hydroxide, tin oxide hydrate and/or manganese hydroxide.

Figure 2:
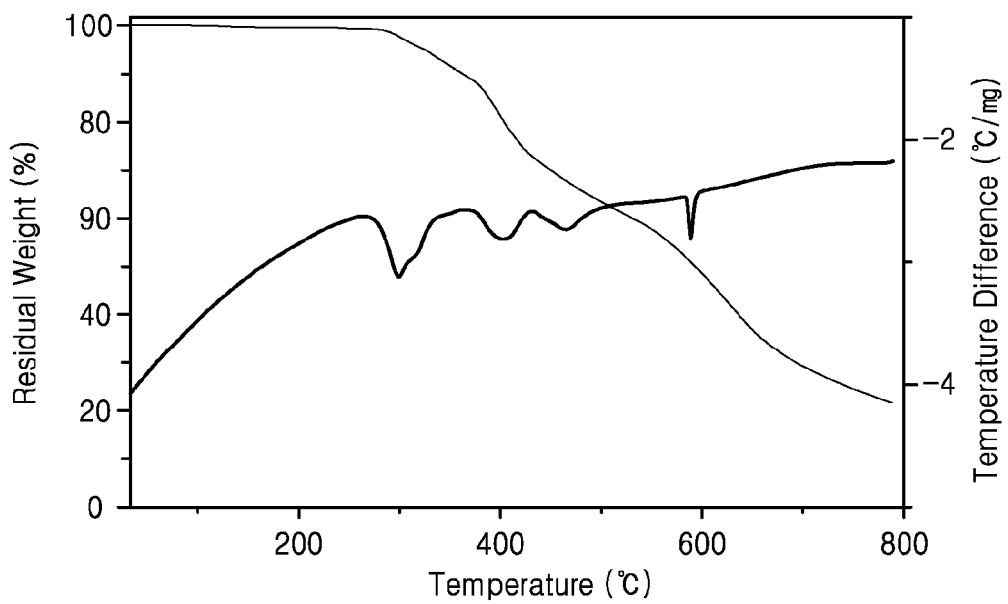
FIG. 2 is a graph showing pyrolysis results obtained by using a flame-retardant blend.

A composition ratio of the flame-retardant blend may depend on application fields having actually intended purposes, and may be changed within a wide range. The flame-retardant blend of the present invention may include 1 to 80.0 wt % of piperazine diphosphate salt and 10 to 80 wt % of melamine polyphosphate according to the application fields serving one component. FIG. 2 is a graph showing pyrolysis results obtained by using the flame-retardant blend. It may be appreciated from FIG. 2 that at the time of being pyrolyzed at about 320° C. the blend had good properties.

In particular, the flame-retardant blend in a plastic molding composition of the present invention may be used in 2 to 50 wt % based on the plastic molding composition. An example of preferred polyolefin-based plastics may include olefin polymers such as polypropylene, high-density polyethylene, low-density polyethylene, linear low-density polyethylene, polybutene-1, and poly-3-methylpentene, or polyolefins such as an ethylene-vinyl acetate copolymer and an ethylene-propylene copolymer, and a copolymer thereof, and in particular, a polypropylene resin is preferred.

Hereinafter, examples of the present invention have been described in detail, but the following examples are to help to specifically understand the present invention to a person skilled in the art, and a scope of the present invention is not limited to the examples.

Used Components

Polypropylene (PP): Commercially Available Standard polymer (Granule)

Flame-retardant Component (Powder):

Piperazine Diphosphate Metal Salt: Component Synthesized in Present Invention

Melamine PolyPhosphate (MPP): NONPLA-601 (DOOBON INC.)

Hydrotalcite: PolyLizer-120 (DOOBON INC.)

Example 1

A flame-retardant (total amount of components including the resin of the present invention is 100 wt %) containing 10 wt % of aluminum piperazine diphosphate salt, 10 wt % of melamine polyphosphate, and 1 wt % of hydrotalcite compound as an inorganic metal hydroxide was blended with each other by using a mixer. After the blend is sufficiently dried, the dried blend was processed with a polypropylene (PP) resin as a molding composition, a Brabender and a press were used to prepare testing samples at a temperature of 150 to 190 (PP), and tests were performed on flame-retardancy with reference to UL94 test (Underwriter Laboratories). Tests for each sample were performed under the same conditions on a purpose of a uniformed mixture.

Example 2

A flame-retardant blend of Example 2 was prepared by the same method as Example 1 except that the aluminum piperazine diphosphate salt was not added thereto but 20 wt % of melamine polyphosphate was blended therewith, and tests on flame-retardancy were performed by the same method as Example 1.

Example 3

A flame-retardant blend of Example 3 was prepared by the same method as Example 1 except that 5 wt % of aluminum piperazine diphosphate salt and 25 wt % of melamine polyphosphate were blended therewith, and tests on flame-retardancy were performed by the same method as Example 1.

Example 4

A flame-retardant blend of Example 4 was prepared by the same method as Example 1 except that 20 wt % of aluminum piperazine diphosphate salt and 5 wt % of melamine polyphosphate were blended therewith, and tests on flame-retardancy were performed by the same method as Example 1.

Example 5

A flame-retardant blend of Example 5 was prepared by the same method as Example 1 except that the blend was processed with a PBT resin as a molding composition, and the Brabender and the press were used to prepare testing samples at a temperature of 190, and tests on flame-retardancy were performed by the same method as Example 1.

Example 6

A flame-retardant blend of Example 6 was prepared by the same method as Example 1 except that magnesium piperazine diphosphate salt was used, and tests on flame-retardancy were performed by the same method as Example 1.

Test results obtained by using the flame-retardant composition according to the present invention are shown in the following Table 1. Each amount used in the composition is shown in wt % and based on the plastic molding composition containing the flame-retardant blend additive.

It is proven from Examples of the present invention that with the piperazine-based and the phosphorus-based additives according to the present invention, the flame-retardancy is slightly increased, and the processability of the polymer is sufficiently improved. In addition, it may be appreciated that the flame-retardant blend obtained by incorporating the aluminum (magnesium) piperazine diphosphate salt, melamine polyphosphate, and hydrotalcite into the polypropylene (PP) as the flame-retardant showed UL-94 flame ratings as being classified as V—O, however, according to Example 2 not including aluminum piperazine diphosphate salt, flame-retardancy was not completely shown and the polymer was degraded to have a light brown color.

Differences between polypropylene (PP) and polyester (PBT) resins of the aluminum piperazine diphosphate salt as the flame-retardant may be appreciated by comparing Example 1 with Example 5. The flame-retardant using polypropylene (PP) showed V—O in UL-94 flame ratings determined by the total fired time adding up 10 data with 5 testing samples; however, in the flame-retardant using polyester (PBT) resin, the flame-retardancy was not completely shown to have a problem in being applied to the resin.

TABLE 1

| Example | Resin | DPPAl | MPP | HT | Fired Time[1] (Sec) | UL 94 Classification | Color |
| --- | --- | --- | --- | --- | --- | --- | --- |
| 1 | PP | 10 | 10 | 1 | 11 | V-O | White |
| 2 | PP | 0 | 20 | 1 | — | — | Light Brown |
| 3 | PP | 5 | 25 | 1 | 25 | V-O | White |
| 4 | PP | 20 | 5 | 1 | 10 | V-O | White |
| 5 | PBT | 10 | 10 | 1 | — | — | White |
| 6 | PP | 10(DPPMg) | 10 | 1 | 17 | V-O | White |

[1]Total fired time after measurement of 5 samples twice

DPPAl: Aluminum piperazine diphosphate salt, MPP: Melamine polyphosphate, HT: Hydrotalcite DPPMg: Magnesium piperazine diphosphate salt

The invention claimed is:

1. A polyolefin resin containing a flame-retardant blend, wherein the flame-retardant blend comprises:
    at least one condensation blend comprising a piperazine diphosphate metal salt, where
    the piperazine diphosphate metal salt is selected from the group consisting of aluminum piperazine diphosphate salt and magnesium piperazine diphosphate salt.

2. The polyolefin resin of claim 1, comprising 10 to 60 wt % of the flame-retardant blend based on 100 parts by weight of a polyolefin-based resin.

3. The polyolefin resin of claim 2, wherein the polyolefin resin contains at least one polymer selected from the group consisting of olefin polymers and thermoplastic polyolefin-based resin of polyolefins.

4. The polyolefin resin of claim 1, wherein the at least one condensation blend further comprises melamine polyphosphate.

5. The polyolefin resin of claim 4, wherein the at least one condensation blend comprises 1 to 80 wt % of the piperazine diphosphate metal salt and 10 to 80 wt % of the melamine polyphosphate.

6. The polyolefin resin of claim 4, wherein the at least one condensation blend further comprises an inorganic compound.

* * * * *